(No Model.)
J. F. MAXFIELD.
FRUIT AND PRODUCE RAILWAY TRANSPORTATION CAR.
No. 267,356. Patented Nov. 14, 1882.
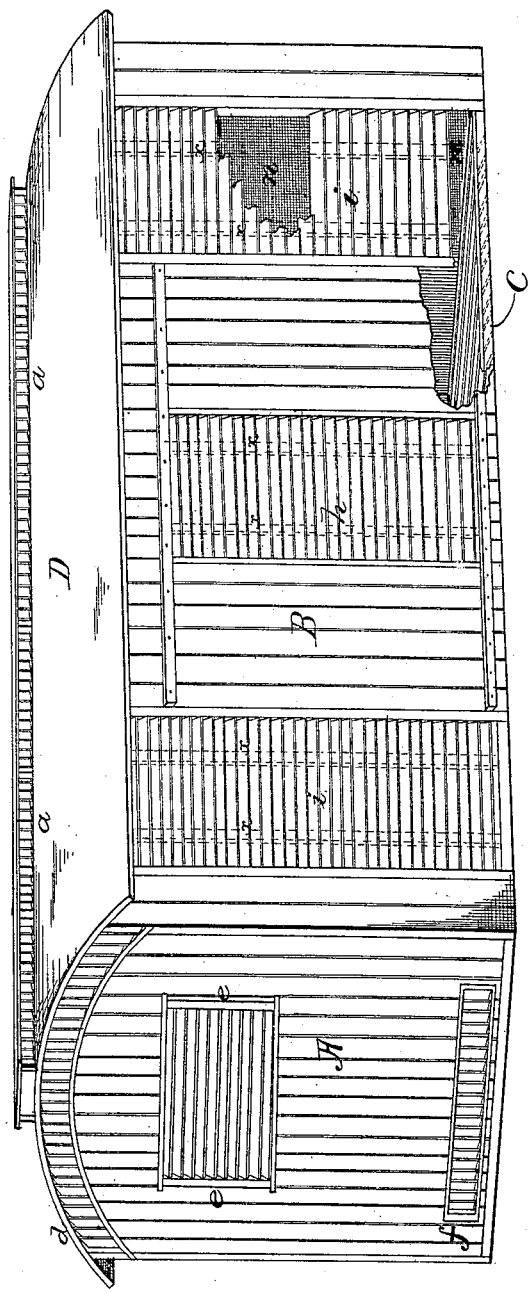
Witnesses;
Robert W. Todd
Chas. C. Gill
Herman Guston
Inventor;
John F. Maxfield
by his attorney
Robert W. Todd
N. PETERS, Photo-Lithographer, Washington, D. C.

UNITED STATES PATENT OFFICE.

JOHN F. MAXFIELD, OF BLOOMFIELD, NEW JERSEY.

FRUIT AND PRODUCE RAILWAY TRANSPORTATION-CAR.

SPECIFICATION forming part of Letters Patent No. 267,356, dated November 14, 1882.

Application filed August 4, 1882. (No model.)

*To all whom it may concern:*

Be it known that I, JOHN F. MAXFIELD, a citizen of the United States, residing at Bloomfield, in the county of Essex and State of New Jersey, have invented certain new and useful Improvements in Fruit and Produce Railway Transportation-Cars; and I do hereby declare the following to be a full, clear, and exact description of the invention, such as will enable others skilled in the art to which it appertains to make and use the same.

The invention relates to an improved fruit and produce railway transportation-car; and it consists essentially in the novel construction of the car, whereby the same may be perfectly ventilated and the fruit in transit preserved in a fresh condition.

Heretofore fruit and produce cars have been constructed in various ways, but in none of these has the result which I secure been attained. In the refrigerator-cars the low temperature of course acts to preserve the fruit; but its effect is such that when the fruit is removed, for purposes of delivery, the change is so great that decay and fermentation at once commence. I have discovered that fresh live air is of greater importance in the preservation of fruit and produce than an air of low temperature, or than a dead air, no matter what its condition in other respects might be.

By the employment of my invention fruit and produce may be transported without danger of spoiling or deteriorating in any degree. The fruit will constantly be surrounded by and subjected to the action of fresh air, and, when the car is in motion, there will be a constant current of air passing over and about the fruit.

The construction of my improved car will be fully understood from the detailed description hereinafter presented, reference being had to the accompanying drawing, illustrating a perspective view of a car embodying the elements of my invention, a portion of the car being broken away so as to show the slatted floor and wire-cloth.

In the drawing, A denotes the end of the car; B, the side, C the floor, and D the roof, thereof. Along the central portion of the roof of the car, and preferably running the entire length thereof, is the ventilator $a$, which will be of any suitable construction that will permit of the escape of heated air from the car. In the present instance, however, the ventilator $a$ consists of the slatted sides of the elevated portion of the roof $m$.

The floor of the car will consist of slats inclined preferably at right angles to the horizontal plane of the floor, whereby the air is permitted to have a free entrance into the car.

At the ends of the car are provided the open slat-work portions $d$ $e$ $f$, forming ventilators across the top of the car immediately below the roof and across the base of the car directly above the floor.

The ventilator $e$ may be of rectangular or other suitable form, and will occupy a position between the ventilators $d$ $f$.

The central parts of the side of the car will be of closely-secured durable wood, in which will be cut an opening for the door $h$, which will be formed of slats, so as to admit the free passage of air through it. Upon each side of the solid central portion of the sides of the car will be constructed the slatted sections $i$, also forming ventilators.

It will be manifest without further description that the car constructed as above described will be thoroughly ventilated, and will permit the constant passage through it of a current of fresh air. The slats forming the ventilator-sections will be inclined downward, so as to shed the rain, and will be covered within the car with wire-cloth $n$ or other suitable material, in order that coal-dirt, dust, &c., may be prevented from entering the car without obstructing the passage of air.

Within the car will be secured moldings or vertical timbers X, (shown in dotted lines,) to prevent the boxes of fruit from striking the ventilators.

What I claim as my invention, and desire to secure by Letters Patent, is—

The car herein described, having ventilators at the floor and roof, and having upon its sides the slatted doors $h$ and slatted sections $i$, and upon its ends the slatted portions $d$ $e$ $f$, all of the slatted parts being supplied within the car with a covering of wire-cloth, substantially as set forth.

In testimony whereof I affix my signature in presence of two witnesses.

JOHN F. MAXFIELD.

Witnesses:
ROBERT W. TODD,
JOSEPH H. NEWTON.